(12) United States Patent
Kokubu et al.

(10) Patent No.: US 9,316,781 B2
(45) Date of Patent: Apr. 19, 2016

(54) LINEAR LIGHT SOURCE DEVICE AND PLANAR LIGHT SOURCE DEVICE

(75) Inventors: Hideki Kokubu, Kiyosu (JP); Yuhki Ito, Kiyosu (JP)

(73) Assignee: TOYODA GOSEI CO., LTD., Kiyosu-shi, Aichi-ken (JP)

( * ) Notice: Subject to any disclaimer, the term of this patent is extended or adjusted under 35 U.S.C. 154(b) by 415 days.

(21) Appl. No.: 13/555,043

(22) Filed: Jul. 20, 2012

(65) Prior Publication Data

US 2013/0077344 A1    Mar. 28, 2013

(30) Foreign Application Priority Data

Sep. 27, 2011  (JP) .................................. 2011-211166

(51) Int. Cl.
*G02B 6/00* (2006.01)
*F21V 8/00* (2006.01)

(52) U.S. Cl.
CPC ............ *G02B 6/0083* (2013.01); *G02B 6/0068* (2013.01); *G02B 6/0073* (2013.01)

(58) Field of Classification Search
CPC ... G02B 6/0068; G02B 6/0073; G02B 6/0083
USPC .................................. 362/608, 612, 609, 606
See application file for complete search history.

(56) References Cited

U.S. PATENT DOCUMENTS 5,831,413 A * 11/1998 Gould ............................ 320/110
7,674,029 B2 * 3/2010 Liu et al. ........................ 362/609
8,231,258 B2 * 7/2012 Kim et al. ...................... 362/609
2007/0109792 A1 * 5/2007 Chosa et al. ................... 362/341
2007/0145383 A1 * 6/2007 Rho et al. ......................... 257/79
2009/0273919 A1 * 11/2009 Park .................. G02F 1/133604
362/97.1

FOREIGN PATENT DOCUMENTS

| CN | 87 2 14630 U | 8/1988 |
|---|---|---|
| JP | S 54-56679 U | 4/1979 |
| JP | S 56-56679 U | 4/1979 |
| JP | 2004-235139 A | 8/2004 |
| JP | 2006-120691 A | 5/2006 |
| JP | 2006-278250 A | 10/2006 |

(Continued)

OTHER PUBLICATIONS

Chinese Office Action dated Mar. 31, 2014, with English translation.

(Continued)

*Primary Examiner* — Sharon Payne
(74) *Attorney, Agent, or Firm* — McGinn IP Law Group PLLC

(57) ABSTRACT

A linear light source device comprises a wiring substrate in a rectangular shape and having a wiring pattern formed thereon, a plurality of light emitting elements arranged on the wiring substrate in a longitudinal direction of the wiring substrate and connected with the wiring pattern on the wiring substrate, and a sealing resin that seals the light emitting elements, wherein the linear light source device is to be arranged on a side surface of a light guiding plate to form a planar light source device, and an external connection terminal is arranged on a surface of the wiring substrate that is opposite to a surface of the wiring substrate where the light emitting element are arranged and in a central portion in the longitudinal direction of the wiring substrate, and connected with the wiring pattern.

20 Claims, 2 Drawing Sheets

(56) References Cited

FOREIGN PATENT DOCUMENTS

| | | |
|---|---|---|
| JP | 2007-194161 A | 8/2007 |
| JP | 2008-60019 A | 3/2008 |
| JP | 2009-032479 A | 2/2009 |
| JP | 2009-176436 A | 8/2009 |
| JP | 2011-113731 A | 6/2011 |
| WO | WO 2009/107275 A1 | 9/2009 |
| WO | WO 2011/086760 A1 | 7/2011 |
| WO | WO 2011/096246 A1 | 8/2011 |

OTHER PUBLICATIONS

Chinese Office Action dated Nov. 15, 2014 with an English translation thereof.
Chinese Office Action dated May 19, 2015 with English Translation.
Japanese Office Action dated Sep. 2, 2014 with an English translation thereof.

* cited by examiner

LINEAR LIGHT SOURCE DEVICE AND PLANAR LIGHT SOURCE DEVICE

BACKGROUND OF THE INVENTION

1. Field of the Invention

The present invention relates to a light source device having a plurality of light emitting elements arranged in a linear configuration, and arranged on the side surface of a light guiding plate for making a planar light source device. Also, the present invention relates to the planar light source device.

2. Description of the Related Art

There is a planar light emission light source having a light guiding plate and a linear light source device arranged on the side surface of the light guiding plate (for example, see Patent Reference 1) as the backlight light source of the liquid crystal display panel for use in cell phones or digital cameras, etc.

The linear light source device includes a printed circuit board having a slender rectangular-shaped wiring pattern formed thereon, light emitting elements arranged in plurality separated from each other along the longitudinal direction of the printed circuit board on the printed circuit board and connected with the wiring pattern of the printed circuit board, reflectors arranged on one side and the other side in the longitudinal direction of the various light emitting elements, respectively, and having a slope surface, and a sealing resin for sealing various light emitting elements.

For the linear light source device, when thermosetting is carried out for the sealing resin, the linear light source device wraps convex downward (in the direction to the surface on the side opposite to the surface of the printed circuit board where the light emitting elements are assembled). As a result, its adhesive property on the light guiding plate degrades, and the light incidence efficiency to the light guiding plate decreases.

According to Patent Reference 2, the reflector arranged for a light emitting element and the reflector arranged for the adjacent light emitting element are not arranged continuously in order to prevent warp of the linear light source device. They are separated from each other by arranging a groove instead. The groove can relax the stress generated due to contradiction of the sealing resin, and it can prevent warp.

In addition, for the conventional linear light source device, a ribbon-shaped flexible substrate is attached for connecting the linear light source device with a power supply (Patent Reference 3).

Patent Reference 1: JP-A-2004-235139
Patent Reference 2: JP-A-2006-120691
Patent Reference 3: JP-A-2009-32479

However, the method described in Patent Reference 2 has insufficient effect in preventing warp. It has low close contact property with the warped light guiding plate, low light incidence efficiency to the light guiding plate, and low luminance of the backlight light source.

As can be seen in Patent Reference 3, when a flexible substrate is used to connect with the power supply, and the planar light source device is configured from the linear light source device and a light guiding plate, the planar light source device becomes bulky because there is the flexible substrate portion, which is undesirable.

SUMMARY OF THE INVENTION

The purpose of the present invention is to solve the aforementioned problems of the prior art by providing a linear light source device that can be used to form the planar light source device in a small size, and it is possible to efficiently suppress warp of the linear light source device. As another purpose, the present invention provides a planar light source device with the linear light source device arranged on the side surface of the light guiding plate, so that it can suppress warp of the linear light source device, enabling it to realize high luminance.

The first aspect relates to a linear light source device which is to be arranged on a side surface of a light guiding plate to form a planar light source device, comprising a wiring substrate in a rectangular shape and having a wiring pattern formed thereon, a plurality of light emitting elements arranged on the wiring substrate in a longitudinal direction of the wiring substrate and connected with the wiring pattern on the wiring substrate, and a sealing resin that seals the light emitting elements, wherein an external connection terminal is arranged on a surface of the wiring substrate that is opposite to a surface of the wiring substrate where the light emitting element are arranged and in a central portion in the longitudinal direction of the wiring substrate, and connected with the wiring pattern.

The linear light source device may also have reflectors, which are provided on the wiring substrate on the side where the light emitting elements are arranged, and which are each formed as two parts having slope surfaces facing each other on one side and the other side in the longitudinal direction of the wiring substrate, respectively, and which are formed separated from each other such that the single light emitting element or each of the a plurality of light emitting elements is sandwiched by the two slope surfaces. It is possible to upward output the light emitted in the horizontal direction of the wiring substrate at high efficiency with the aid of the reflectors. When the reflectors are arranged, the sealing resin is formed such that it buries the recession surrounded with the two slope surfaces and the back surface of the wiring substrate on the side where the light emitting elements are arranged.

Connection of the wiring pattern with the external connection terminals may be carried out by arranging through-holes on the wiring substrate and plating the inner wall of each through hole with a metal, or by burying the entirety of the through-holes with an electro-conductive metal. It is also preferred that the external connection terminals have a structure free of spring elasticity.

The second aspect relates to the linear light source device according to the first aspect, wherein there are also reflectors, which are formed as two parts having slope surfaces facing each other on one side and the other side in the longitudinal direction of the wiring substrate, respectively, and which are arranged separated from each other on the wiring substrate such that the single light emitting element or each of the plurality of light emitting elements is sandwiched by the two slope surfaces; and the sealing resin is formed such that it buries the recession surrounded with the two slope surfaces and the outer surface of the wiring substrate where the light emitting elements are arranged.

The third aspect relates to a planar light source device including a light guiding plate, the linear light source device described in the first and second aspect and arranged on the side surface of the light guiding plate, and a connector in contact with the external connection terminal of the linear light source device; the connector is anchored pressing the central portion in the longitudinal direction of the linear light source device to the light guiding plate side, and the external connection terminal and the connector are in contact with each other.

The connector may have any structure as long as it can make contact with the external connection terminal. Especially, a spring-shaped terminal is preferred. While making contact with the external connection terminal, it presses the external connection terminal, so that it can indirectly press the central portion in the longitudinal direction of the light emitting device 10. Consequently, it is possible to correct the warp of the linear light source device. There is no specific restriction on the shape of the spring-shaped terminal, as long as it has spring elasticity and the succeeding can make contact with the external connection terminal while pressing it. For example, the connector may have two parts on the positive electrode side and the negative electrode side, respectively. Each part may be made of a linear or plate-shaped metal member in any of the following shapes: < shape, Λ shape, L shape, semi-arc shape, spiral shape, etc. There is no specific restriction on the configuration of the two parts of the external connection terminal and the connector on the positive electrode side and the negative electrode side. However, it is preferred that the two parts are arranged side-by-side in the longitudinal direction of the light emitting device 10 in order to facilitate manufacturing and in consideration of the arrangement space.

The fourth aspect relates to the planar light source device according to the third aspect, wherein the connector is a spring-shaped terminal.

According to the present invention, there is no need to use a flexible substrate to connect the linear light source device with the power supply, and it is possible to reduce the size of the planar light source device. In addition, as the central portion in the longitudinal direction of the linear light source device is pressed towards the light guiding plate side so that the external connection terminal and the connector are brought in contact with each other, it is possible to correct the warp of the linear light source device, and it is possible to increase the light incidence efficiency as the light is incident from the linear light source device into the light guiding plate, and it is possible to increase the luminance of the planar light source device.

DESCRIPTION OF THE PREFERRED EMBODIMENTS

Embodiments of the present invention will be explained in the following sections with reference to the drawings. However, the present invention is not limited to the embodiments.

Embodiment 1

Figure 1:
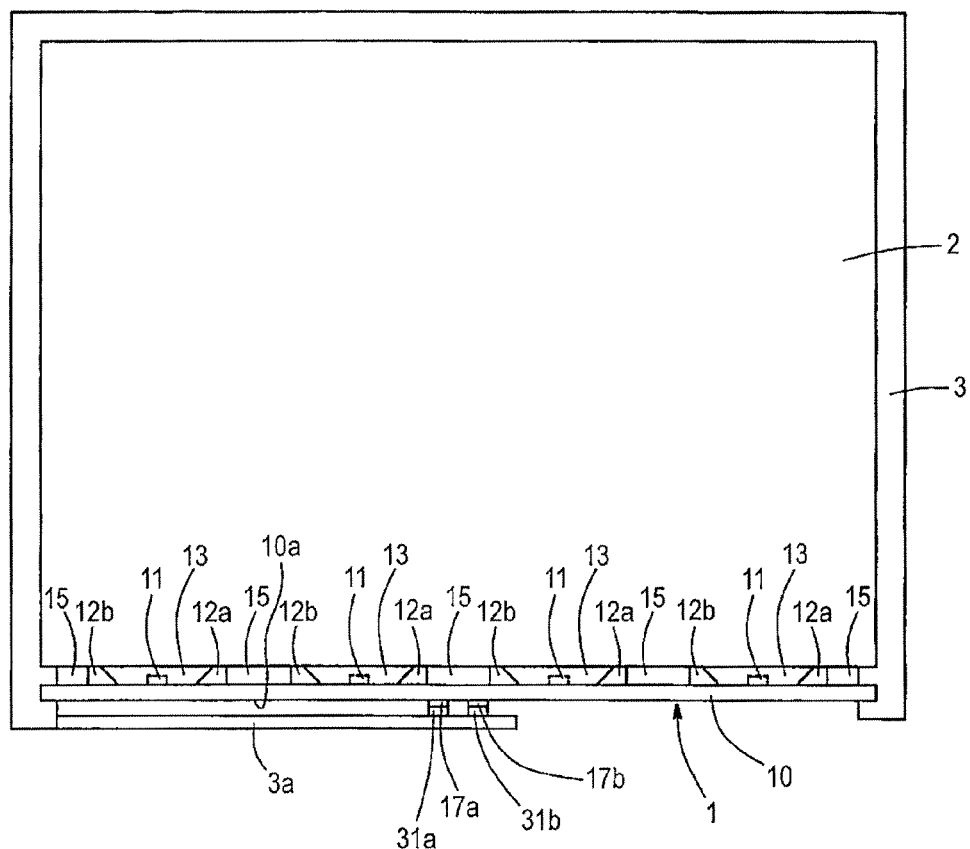
FIG. 1 is a diagram illustrating the constitution of the planar light source device in Embodiment 1.

FIG. 1 is a diagram illustrating the configuration of the planar light source device in Embodiment 1. As shown in FIG. 1, the planar light source device includes a linear light source device 1, a light guiding plate 2, and a frame 3. Here, the linear light source device 1 is arranged such that it has its light emitting direction towards the side surface of the light guiding plate 2, and it is in contact with the side surface of the light guiding plate 2. The frame 3 has a structure that has the light guiding plate 2 and the linear light source device 1 inserted therein so that the position of the linear light source device 1 is anchored with respect to the light guiding plate 2.

Figure 2:
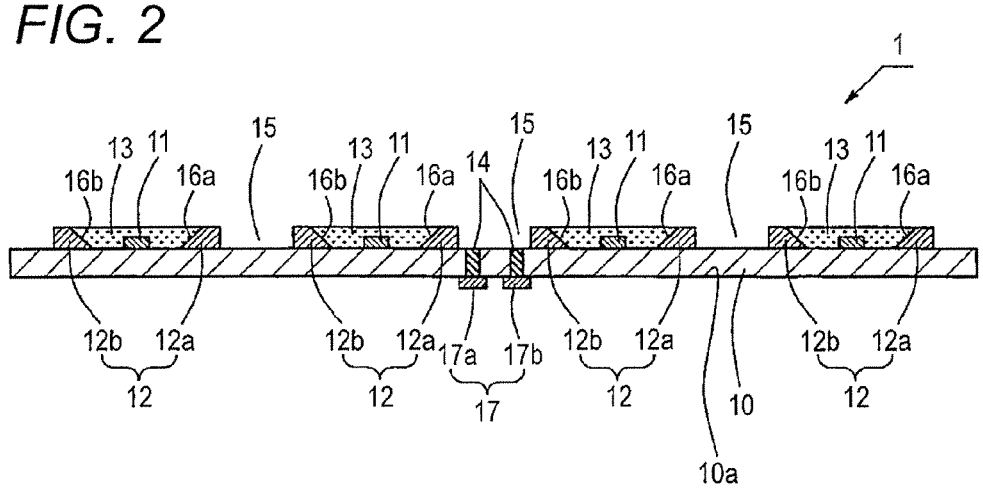
FIG. 2 is a cross-sectional view illustrating the constitution of the linear light source device 1.
Figure 3:
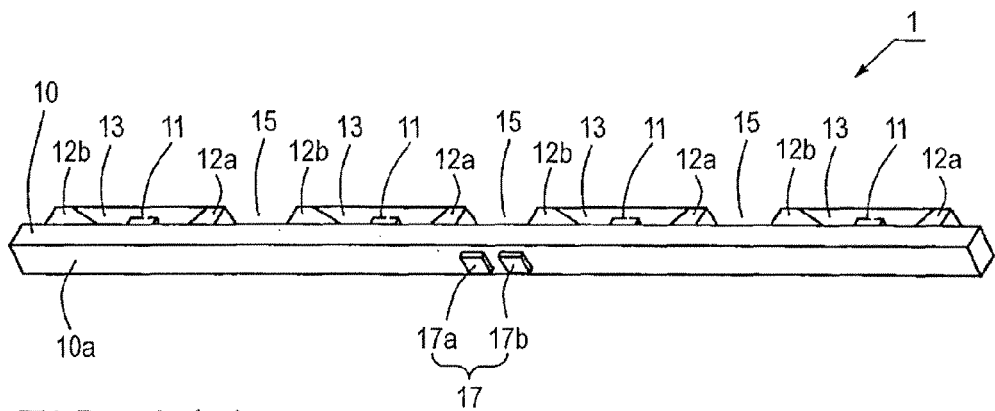
FIG. 3 is a diagram illustrating the view of the linear light source device 1 from the back side.

The configuration of the linear light source device 1 will be explained in the following texts in more detail. FIG. 2 is a cross-sectional view illustrating the configuration of the linear light source device 1. FIG. 3 is a diagram illustrating the linear light source device 1 as viewed in the oblique direction from the back side (the side opposite to the light emitting direction). As shown in FIGS. 2 and 3, the linear light source device 1 in Embodiment 1 includes a slender rectangular-shaped wiring substrate 10, light emitting elements 11 arranged in linear configuration on the wiring substrate 10, reflectors 12 arranged on the wiring substrate 10 for each light emitting element, and a sealing resin 13 that seals the light emitting elements 11.

The wiring substrate 10 is a FR-5 substrate made of glass cloth base material [and] bismaleimide triazine resin. One may also use the FR-4 substrate made of glass cloth base material [and] epoxy resin, or the like. A wiring pattern is formed on the surface of the wiring substrate 10, and the wiring pattern and the light emitting elements 11 are connected with each other via bonding wires (not shown in the figure). Here, the wiring substrate 10 has a slender rectangular shape.

Two through-holes 14 are arranged through and perpendicular to the principal surface of the wiring substrate 10 at the central portion in the longitudinal direction of the wiring substrate 10. On the back surface 10a (the side opposite to the side where the wiring pattern is formed, the side opposite to the side where the light emitting elements 11 are arranged) of the wiring substrate 10, and in the central portion in the longitudinal direction of the wiring substrate 10, an external connection terminal 17 (including two parts 17a, b on the positive electrode side and negative electrode side, respectively) is arranged, and the wiring pattern on the surface of the wiring substrate 10 and the external connection terminal 17 are connected with each other via the through-holes 14.

The two parts 17a, b of the external connection terminal 17 are arranged side-by-side and separated from each other in the longitudinal direction of the wiring substrate 10. In addition, in Embodiment 1, one may also adopt a scheme in which the external connection terminal 17 protrudes from the back surface of the wiring substrate 10 with a height corresponding to the thickness of the metal plate. One may also adopt a scheme in which the metal plate is buried in the wiring substrate 10. In this case, the surface of the metal plate may protrude upward from the back surface 10a of the wiring substrate 10, or coplanar with the back surface 10a, or below the back surface 10a. Especially, it is possible to form a recession below the back surface 10a. The spring-shaped terminal in contact with the external connection terminal 17 is anchored by this recession, so that it is possible to prevent the spring-shaped terminal from shifting to out of contact with the external connection terminal 17. In addition, the metal for burying the spring-shaped terminal may be used as the external connection terminal 17 as it is. In addition, the two parts 17a, b of the external connection terminal 17 may not necessarily be arranged side-by-side in the longitudinal direction of the wiring substrate 10. They may also be arranged side-by-side in the lateral direction. However, in order to facilitate manufacturing, it is preferred that they are arranged side-by-side in the longitudinal direction.

The light emitting element 11 is a face-up-type LED made of group III nitride semiconductors of blue light emission. The light emitting elements 11 are arranged in plurality in a straight line along the longitudinal direction of the wiring substrate 10 on the wiring substrate 10. In addition, wiring pattern of the wiring substrate 10 and the n-electrodes, p-electrodes (neither of which is shown in the drawing) of the light emitting elements 11 are connected through the bonding wire (not shown in the drawing).

Although the light emitting elements 11 are wired-bonding to the wiring substrate 10 as the face-up type in Embodiment 1, the light emitting elements 11 may use a configuration of flip chip type or that takes conduction in the vertical direction.

The reflectors 12 are arranged on the wiring substrate 10 and separated from each other by a groove 15 for each of light emitting elements 11. The reflectors 12 may be made of the following types of resin materials: polyphthalamide, liquid crystal polymer, epoxy resin, silicone resin, etc. Each of the reflectors 12 includes two parts 12*a*, *b* facing each other with a light emitting element 11 sandwiched between them in the longitudinal direction of the linear light source device 1. The parts 12*a*, *b* have slope surfaces 16*a*, *b* that are inclined with respect to the principal surface of the wiring substrate 10 on the side of the light emitting elements 11. The slope surfaces 16*a*, *b* have inclination angle such that the light from the light emitting elements 11 is in the shape of V, looking from above. As the result of the light of the light emitting elements 1 being reflected upward by the slope surfaces 16*a*, *b*, the luminance of the linear light source device 1 increases, and, at the same time, it is possible to reduce the unevenness in the luminance. The top portions of reflectors 12*a*, *b* (the portions most away from the wiring substrate 10 in the direction perpendicular to the principal surface of the wiring substrate 10) are planes (hereinafter to be referred to as the top surfaces of the reflectors 12) parallel with the principal surface of the wiring substrate 10. As shown in FIG. 1, the two parts 12*a*, *b* of the reflector 12 are in the longitudinal direction of the wiring substrate 10, and the cross-section taken in the direction perpendicular to the principal surface of the wiring substrate 10 is a trapezium defined by the following edges: a lower edge as the edge that cuts the surface in contact with the wiring substrate 10, an upper edge as the edge that cuts the upper surface of the reflector 12 parallel with the lower edge, the oblique edges as the edges that cut the slope surfaces 16*a*, *b*, and edges perpendicular to the lower edge and the upper edge.

Each of the reflectors 12 is arranged for one light emitting element 11 in Embodiment 1. However, one may also adopt a scheme in which a reflector may be arranged for a plurality of light emitting elements (e.g., 2 or 3 light emitting elements). When a plurality of light emitting elements are arranged for each reflector, the plurality of light emitting elements may be arranged side-by-side along the longitudinal direction of the wiring substrate. However, other scheme of configuration may also be adopted.

The sealing resin 13 is a silicone resin with yellow phosphor mixed in it. It seals the light emitting elements 11. However, one may also use epoxy resin or the like as the sealing resin 13. While sealing resin 13 can protect the light emitting elements 11 and the bonding wires, it can convert a portion of the blue light emitted from the light emitting elements 11 to yellow light, so that the blue light and yellow light are blended with each other to become white light. Also, the sealing resin 13 is formed to fill up the recession surrounded with the slope surfaces 16*a*, *b* of the reflectors 12 and the wiring substrate 10 where the light emitting elements 11 are arranged. After the sealing resin 13 bonds the silicone resin with viscosity, it is subjected to heat treatment to be cured. During the heat treatment, the silicone resin contracts, so that a stress takes place in the wiring substrate 10, leading to warp of the wiring substrate 10 that bends to a convex shape from the assembling side of the light emitting elements 11 of the wiring substrate 10 to the back side. With this stress, the linear light source device 1 warps to a convex shape towards the side of the back side of the wiring substrate 10 (the side of the surface on the side opposite to the side where the light emitting elements 11 are arranged).

The sealing resin 13 may also be prepared by blending a reflective material for diffusing the light from the light emitting elements 11. Here, for example, the reflective material may be made of silica grains or the like.

The following operation takes place when a voltage is applied on the external connection terminal 17 of the linear light source device 1. As the voltage is applied, current flows via the wiring pattern of the wiring substrate 10 to the light emitting elements 11. Blue light is emitted in a radiating shape from the light emitting elements 11. A portion of the light is irradiated via the sealing resin 13 upward, and another portion goes through the sealing resin 13 to reach the slope surfaces 16*a*, *b* of the reflectors 12, and the light is reflected by the slope surfaces 16*a*, *b* upwards. Here, a portion of the blue light is converted to yellow light by the yellow phosphor blended in sealing resin 13. Consequently, the blue light and the yellow light are blended to generate white light. In this way, the blue light from the light emitting elements 11 is converted to white light that diffuses upward. The light also diffuses in a linear shape, as the light emitting elements 11 are arranged in linear configuration. As a result, the linear light source device 1 emits linear-shaped white light.

The linear light source device 1 will be explained in the following sections in detail.

The light guiding plate 2 will be explained in the following text. The light guiding plate 2 is a rectangular plate, and it is made of acrylic resin, polycarbonate resin, or the like. The linear light source device 1 is positioned on the side surface of the light guiding plate 2, in contact with the side surface with the light emitting direction towards the side surface of the light guiding plate 2. The light incident into the light guiding plate 2 is reflected from the interior, and it is output in the direction perpendicular to the principal surface of the light guiding plate 2. Consequently, it is possible to emit light in a planar shape.

The frame 3 will be explained in the following text. The frame 3 has a hollow portion for inserting the linear light source device 1 and the light guiding plate 2. The linear light source device 1 and the light guiding plate 2 are inserted in the hollow portion, and the linear light source device 1 contacts the side surface of the light guiding plate 2. The orientation of the linear light source device 1 is such that the light emitting direction is oriented towards the side surface of the light guiding plate 2. Also, the frame 3 has a portion 3*a* that extends to the side of the back surface 10*a* of the linear light source device 1 (the side opposite to the side of the light guiding plate 2), and, in this portion 3*a*, a spring-shaped terminal 31 is arranged that is pressed to contact the external connection terminal 17 arranged on the back surface 10*a* of the wiring substrate 10 of the linear light source device 1.

Figure 4:
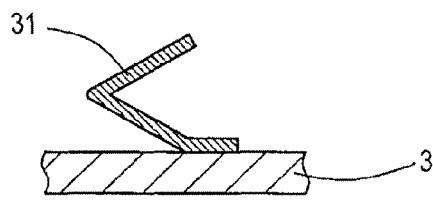
FIG. 4 is a diagram illustrating an example of the shape of the spring-shaped terminal 31.
Figure 4:
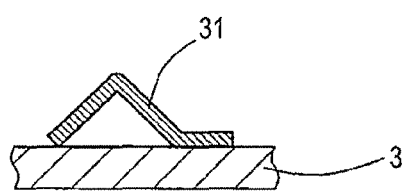
Figure 4:
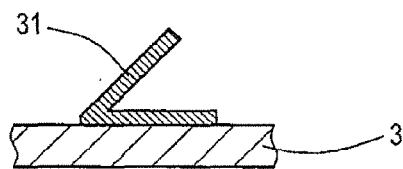

The spring-shaped terminal 31 has parts 31*a*, 31*b* corresponding to the positive electrode side and negative electrode side, respectively. The two parts 31*a*, 31*b* of the spring-shaped terminal 31 are arranged facing the two parts 17*a*, *b* of the external connection terminal 17, respectively. The two parts 31*a*, 31*b* of the spring-shaped terminal 31 are in contact with the two parts 17*a*, *b* of the external connection terminal 17, respectively, and they are pressed by the spring elasticity. There is no restriction on the structure of the parts 31*a*, 31*b* of the spring-shaped terminal 31, as long as the structure has the spring elasticity. For example, it may be made of a linear or sheet shaped metal material in < shape, Λ shape, L shape, semi-arc shape, spiral shape, etc. FIG. 4 is a diagram illustrating an example of the spring-shaped terminal 31. As shown in FIG. 4(a), the spring-shaped terminal 31 is made of a wire shaped metal material folded in < shape. The spring-shaped terminal 31 shown in FIG. 4(b) is made of wire shaped metal material folded to Λ shape. The spring-shaped terminal 31 shown in FIG. 4(c) is made of a wire shaped metal material folded to L shape.

For the planar light source device in Embodiment 1 explained above, while the linear light source device 1 is anchored on the side surface of the light guiding plate 2 by frame 3, it is brought in contact with the external connection terminal 17 of the linear light source device 1 by the spring-shaped terminal 31 arranged on frame 3, and the central portion in the longitudinal direction of the wiring substrate 10 is pressed. As a result, warp of the linear light source device 1 is corrected, and the light incidence efficiency for the light incident from the linear light source device 1 to the light guiding plate 2 is increased, so that it is possible to increase the luminance of the planar light source device in Embodiment 1. It is also possible to reduce the size of the planar light source device, because no flexible substrate is used to connect the linear light source device and the power supply as would be adopted in the prior art.

There are four reflectors 12 of the linear light source device 1 in Embodiment 1. A light emitting element is arranged for each of reflectors 12. However, the number of the reflectors 12 is not limited to four. Here, it is preferred that the number of the reflectors 12 be an even number. If the number is an odd number, the external connection terminal 17 would be positioned facing the light emitting element 11. Consequently, for the light emitting element 11 at the opposite position, the pressure rises due to pressing of the spring-shaped terminal, so that cutoff of the bonding wires and other troubles may take place. On the other hand, when the number of the reflectors 12 is an even number, groove 15 is formed at the position facing the external connection terminal 17, so that the pressure on the light emitting elements 11 is not increased due to pressing of the spring-shaped terminal.

Blue light LEDs are used as the light emitting elements 11 of the linear light source device 1, yellow phosphor is used as the phosphor blended in the sealing resin 13, and white light is emitted from the linear light source device 1 in Embodiment 1. However, the light color of the light emitting elements 11 and the color of the phosphor are not limited to the aforementioned types. For example, one may also adopt a scheme in which blue light LEDs are used as the light emitting elements, and two phosphors, that is, red phosphor and green phosphor, are used as the phosphors blended in the sealing resin 13, so that the white light is emitted from the linear light source device 1. As other schemes that may also be adopted, there are two light emitting elements, that is, a blue light LED and the green light LED, arranged in each of reflectors 12, and a red phosphor is used as the phosphor blended in the sealing resin 13; or two LEDs, that is a blue light LED and the red light LED, are arranged in each of reflectors 12, and a green phosphor is used as the phosphor blended in the sealing resin 13; or, three LEDs, that is, a blue light LED, a green light LED, and a red light LED, are arranged in each of reflectors 12, so that the light emitted from the linear light source device 1 is white light.

The linear light source device 1 is arranged on one side surface of the light guiding plate 2 in Embodiment 1. However, one may also adopt a scheme in which two or more side surfaces have the linear light source devices arranged on them to form the planar light source device.

The reflectors 12 are used in Embodiment 1. However, one may also adopt a scheme in which reflectors 12 are not arranged, and the structure only has the light emitting elements 11 sealed by the sealing resin 13.

The linear light source device of the present invention is combined with a light guiding plate to form a planar light source device that can be adopted as the backlight light source for cell phones, digital cameras, and other small size liquid crystal display panels.

What is claimed is:

1. A linear light source device which is to be arranged on a side surface of a light guiding plate to form a planar light source device, comprising:
    a wiring substrate in a rectangular shape and having a wiring pattern formed thereon;
    a plurality of light emitting elements arranged on a first surface of the wiring substrate in a longitudinal direction of the wiring substrate and connected with the wiring pattern on the wiring substrate; and
    a sealing resin that seals the light emitting elements,
    wherein an external connection terminal is arranged on a second surface of the wiring substrate that is parallel to the first surface of the wiring substrate where the light emitting elements are arranged,
    wherein the external connection terminal is arranged in a central portion of the second surface in the longitudinal direction of the wiring substrate such that a first distance between a center point of the wiring substrate and the external connection terminal is less than a second distance between the center point and an edge on a width side of the wiring substrate, and
    wherein the external connection terminal is connected with the wiring pattern,
    the linear light source device further comprising a connector that is electrically connected to the external connection terminal by pushing the connector toward the external connection terminal so that a warp of the wiring substrate is modified.

2. The linear light source device according to claim 1, further comprising:
    reflectors configured as two parts having slope surfaces facing each other on one side and the other side in the longitudinal direction of the wiring substrate, respectively, and which are arranged separated from each other on the wiring substrate so that the single light emitting element or each of the plurality of light emitting elements is sandwiched by the two slope surfaces,
    wherein the sealing resin is formed such that it buries a recession surrounded with the two slope surfaces and the surface of the wiring substrate where the light emitting elements are arranged.

3. The linear light source device according to claim 1, further comprising:
    through-holes which are arranged through and perpendicular to the first surface of the wiring substrate at the central portion in the longitudinal direction of the wiring substrate.

4. The linear light source device according to claim 1, further comprising:
    through-holes which are arranged through and perpendicular to the first surface of the wiring substrate at the central portion in the longitudinal direction of the wiring substrate,
    wherein the external connection terminal includes a positive electrode side and a negative electrode side each of which correspond to a through-hole of the through-holes, and
    wherein the through-holes electrically connect the wiring substrate and the external connection terminal.

5. The linear light source device according to claim 1, wherein the external connection terminal is disposed between adjacent light emitting elements of the plurality of light emitting elements in the longitudinal direction.

6. The linear light source device according to claim 1, wherein the through-holes are disposed between adjacent light emitting elements of the plurality of light emitting elements in the longitudinal direction.

7. The linear light source device according to claim 1, wherein the external connection terminal protrudes from the second surface of the wiring substrate.

8. The linear light source device according to claim 1, wherein the external connection terminal includes two parts arranged side-by-side disposed between adjacent light emitting elements of the plurality of light emitting elements in the longitudinal direction.

9. The linear light source device according to claim 1, further comprising:
a plurality of reflectors arranged on the wiring substrate corresponding to the light emitting elements, respectively, each of which includes two parts, a first part of the two parts having a slope surface on one side which slopes downwardly in a first direction and a second part of the two parts having a slope surface which slopes downwardly in a second direction, the slope surface of the first part and the slope surface of the second part facing each other in the longitudinal direction of each light emitting element,
wherein the external connection terminal is disposed between the first part which has the slope surface which slopes downwardly in the first direction of a first reflector of the reflectors and the second part having the slope surface which slopes downwardly in the second direction of a second reflector of the reflectors which is adjacent to the first part of the first reflector in the longitudinal direction.

10. The linear light source device according to claim 1, further comprising:
a plurality of reflectors arranged on the wiring substrate corresponding to the light emitting elements, respectively, each of which includes two parts, a first part of the two parts having a slope surface on one side which slopes downwardly in a first direction and a second part of the two parts having a slope surface which slopes downwardly in a second direction, the slope surface of the first part and the slope surface of the second part facing each other in the longitudinal direction of each light emitting element; and
through-holes which are disposed between the first part which has the slope surface which slopes downwardly in the first direction of a first reflector of the reflectors and the second part having the slope surface which slopes downwardly in the second direction of a second reflector of the reflectors which is adjacent to the first part of the first reflector in the longitudinal direction,
wherein the through-holes electrically connect the wiring substrate and the external connection terminal.

11. The linear light source device according to claim 1, further comprising:
a plurality of reflectors arranged on the wiring substrate corresponding to the light emitting elements, respectively, each of which includes two parts, a first part of the two parts having a slope surface on one side which slopes downwardly in a first direction and a second part of the two parts having a slope surface which slopes downwardly in a second direction, the slope surface of the first part and the slope surface of the second part facing each other in the longitudinal direction of each light emitting element, an upper surface of the first part which has the slope surface which slopes downwardly in the first direction of a first reflector of the reflectors being co-planar with an upper surface of the second part having the slope surface which slopes downwardly in the second direction of a second reflector of the reflectors which is adjacent to the first part of the first reflector in the longitudinal direction.

12. The linear light source device according to claim 1, further comprising:
a plurality of reflectors arranged on the wiring substrate corresponding to the light emitting elements, respectively, each of which includes two parts, a first part of the two parts having a slope surface on one side which slopes downwardly in a first direction and a second part of the two parts having a slope surface which slopes downwardly in a second direction, the slope surface of the first part and the slope surface of the second part facing each other in the longitudinal direction of each light emitting element, an upper surface of the first part which has the slope surface which slopes downwardly in the first direction of a first reflector of the reflectors and an upper surface of the second part having the slope surface which slopes downwardly in the second direction of a second reflector of the reflectors which is adjacent to the first part of the first reflector in the longitudinal direction being parallel with the first surface.

13. The linear light source device according to claim 1, further comprising:
a plurality of reflectors arranged on the wiring substrate corresponding to the light emitting elements, respectively, each of which includes two parts, a first part of the two parts having a slope surface on one side which slopes downwardly in a first direction and a second part of the two parts having a slope surface which slopes downwardly in a second direction, the slope surface of the first part and the slope surface of the second part facing each other in the longitudinal direction of each light emitting element, an upper surface of the first part and an upper surface of the second part being parallel to the first surface.

14. The linear light source device according to claim 1, further comprising:
a plurality of reflectors arranged on the wiring substrate corresponding to the light emitting elements, respectively, each of which includes two parts, a first part of the two parts having a slope surface on one side which slopes downwardly in a first direction and a second part of the two parts having a slope surface which slopes downwardly in a second direction, the slope surface of the first part and the slope surface of the second part facing each other in the longitudinal direction of each light emitting element, an upper surface of the first part which has the slope surface which slopes downwardly in the first direction of a first reflector of the reflectors being co-planar with an upper surface of the second part having the slope surface which slopes downwardly in the second direction of a second reflector of the reflectors which is adjacent to the first part of the first reflector in the longitudinal direction.

15. A planar light source device, comprising:
a light guiding plate;
the linear light source device according to claim 1 and arranged on the side surface of the light guiding plate; and a connector in contact with the external connection terminal of the linear light source device,
wherein the connector is anchored pressing the central portion in the longitudinal direction of the linear light source device to the light guiding plate side,
wherein the external connection terminal and the connector are in contact with each other, and
wherein the connector is electrically connected to the external connection terminal by pushing the connector toward the external connection terminal so that a warp of the wiring substrate is modified.

16. The planar light source device according to claim 15, wherein the connector includes a spring-shaped terminal.

17. A linear light source device which is to be arranged on a side surface of a light guiding plate to form a planar light source device, comprising:
a wiring substrate in a rectangular shape and having a wiring pattern formed thereon;
a plurality of light emitting elements arranged on a principal surface the wiring substrate in a longitudinal direction of the wiring substrate and connected with the wiring pattern on the wiring substrate; and
a sealing resin that seals the light emitting elements,
wherein an external connection terminal is arranged on a back surface of the wiring substrate that is opposite to the principal surface of the wiring substrate where the light emitting elements are arranged,
wherein the external connection terminal is arranged in a central portion of the second surface in the longitudinal direction of the wiring substrate such that a first distance between a center point of the wiring substrate and the external connection terminal is less than a second distance between the center point and an edge on a width side of the wiring substrate, and
wherein the external connection terminal is connected with the wiring pattern,
the linear light source device further comprising a connector that is electrically connected to the external connection terminal by pushing the connector toward the external connection terminal so that a warp of the wiring substrate is modified.

18. The linear light source device according to claim 17, further comprising:
a plurality of reflectors arranged on the wiring substrate corresponding to the light emitting elements, respectively, each of which includes two parts, a first part of the two parts having a slope surface on one side which slopes downwardly in a first direction and a second part of the two parts having a slope surface which slopes downwardly in a second direction, the slope surface of the first part and the slope surface of the second part facing each other in the longitudinal direction of each light emitting element; and
through-holes which are disposed between the first part which has the slope surface which slopes downwardly in the first direction of a first reflector of the reflectors and the second part having the slope surface which slopes downwardly in the second direction of a second reflector of the reflectors which is adjacent to the first part of the first reflector in the longitudinal direction,
wherein the through-holes electrically connect the wiring substrate and the external connection terminal.

19. The linear light source device according to claim 17, further comprising:
through-holes which are arranged through and perpendicular to the first surface of the wiring substrate at the central portion in the longitudinal direction of the wiring substrate,
wherein the external connection terminal includes a positive electrode side and a negative electrode side each of which correspond to a through-hole of the through-holes, and
wherein the through-holes electrically connect the wiring substrate and the external connection terminal.

20. The linear light source device according to claim 17, wherein the external connection terminal is disposed between adjacent light emitting elements of the plurality of light emitting elements in the longitudinal direction.

* * * * *